United States Patent Office 3,095,390
Patented June 25, 1963

3,095,390
COPOLYMERISATION PRODUCTS OF AMIDES OF COPOLYMERISABLE CARBOXYLIC ACIDS CONTAINING QUATERNARY AMMONIUM GROUPS BOUND TO AMIDE NITROGEN
Arthur Maeder, Basel, Switzerland, assignor to Ciba Limited, Basel, Switzerland
No Drawing. Filed Oct. 25, 1954, Ser. No. 464,599
Claims priority, application Switzerland Oct. 30, 1953
5 Claims. (Cl. 260—17)

This invention is based on the observation that valuable copolymers can be obtained by jointly polymerising an amide of an at least copolymerisable acid, which in the amide portion of the molecule contains at least one quaternary ammonium grouping which is not bound to a hetero-atom through a methylene bridge, and at least one other polymerisable compound. The stipulation that the quaternary ammonium group must not be bound to a hetero-atom through a methylene bridge means that at least two carbon atoms should be situated between the ammonium group and the nearest hetero atom. The term "at least copolymerisable acid" encompasses acids which are polymerisable with themselves and also copolymerisable as well as acids that are only copolymerisable.

Suitable starting materials for making the quaternary ammonium compounds to be used in the present invention are basic amides which contain a tertiary amino group which is not bound to a hetero-atom by a methylene bridge. Such amides are known, or can be made by methods in themselves known. The basic amides may be derived from any polymerisable or copolymerisable acids such as crotonic acid, maleic acid, furylacrylic acid, α-chloracrylic acid, methacrylic acid, but especially acrylic acid. Typical polymerizable acids are represented by the formula:

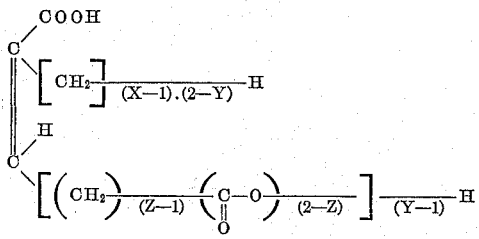

wherein X, Y and Z are each either 1 or 2. For making the basic amides there may be used any diamines or polyamines. There may be mentioned, for example, N':N'-diethyl-ethylene diamine, N:N'-diethyl-propylene diamine, and also polyalkylene polyamines, such as diethylene triamine, triethylene tetramine, tetraethylene pentamine, and also heterocyclic diamines such as piperazine, or aromatic diamines such as para-dimethyl-amino-aniline. There may also be used diamines which contain an aliphatic hydrocarbon radical of high molecular weight, such as are obtainable by the additive combination of fatty amines with acrylonitrile followed by reduction. If diamines or polyamines are used which contain no tertiary amino group, the conversion of the primary or secondary amino groups into tertiary amino groups may be carried out before or after the formation of the amide. If polyamines are used, compounds can be made which contain two or more polymerisable groupings. By using starting materials which contain several basic nitrogen atoms it is possible to introduce several quaternary groupings into the molecule. There may also be used as starting materials basic polymerisable compounds which contain a hardenable component. Such compounds can be made, for example, by reacting a formaldehyde condensation product of a compound of the aminotriazine or urea group with a compound introducing the acrylic acid residue and with a polyamino-compound of the kind mentioned above, and so selecting the relative proportions of the reactants that at least one methylol group or methylol group etherified with a lower alcohol, which group enables hardening to take place, remains in the molecule, unless methylol groups are introduced subsequently.

As will be apparent from the foregoing description a large number of starting compounds may be used for making the quaternary ammonium compounds. The above enumeration of compounds is incomplete and merely indicates the various possible alternatives.

Those compounds are preferred which contain only one tertiary amino group and the molecule of which contains only aliphatic radicals or aliphatic and heterocyclic radicals or which, if it contains an aromatic radical, contains no radical other than a six-membered aromatic radical, that is to say, a benzene radical which may be substituted.

The quaternary ammonium compounds are made by methods in themselves known by the action of compounds which are capable of converting tertiary amino groups into quaternary ammonium groups. As such compounds there may be mentioned, for example, alkylating agents, such as dimethylsulphate, ethyl bromide, methyl iodide, epichlorhydrin, chloracetamide, and also aralkylating agents such as benzyl chloride and nuclear substitution products thereof, and furthermore toluene sulphonic acid ester. In the case of salts of tertiary amines there may also be used as quaternating agents alkylene oxides such as ethylene oxide. Those quaternating agents are preferred which contain an additional reactive atom grouping which is not polymerisable. "Reactive atom groupings" are intended to mean, for example, epoxy groups, movable halogen atoms, acetal groups and particularly hydrogen atoms bound to hetero-atoms. There come into consideration hydroxyl groups, amide groups or N-methylol groups; especially valuable quaternating agents are epichlorhydrin, chloracetamide and N-methylol-chloracetamide. The quaternating agents with reactive atom groupings present the advantage over the usual quaternating agents that compounds are formed which are not merely polymerisable, but are capable of undergoing further reactions, too. As a rule, this latter property characterises also the polymerisation and copolymerisation products made from the monomeric compounds. Such monomeric or polymeric compounds can be used, for example, for cross linking reactions in which no polymerisation takes place.

Another method of preparing the quaternary ammonium compounds consists in using basic compounds which are saturated but which can easily be converted into unsaturated polymerisable compounds. For example, the basic β-chloro-propionic acid amide may be quaternated and hydrogen chloride subsequently split off.

The quaternary ammonium compounds are generally soluble in water in the monomeric condition, provided that they are derived from the usual inorganic or organic acids.

In accordance with the invention the quaternary ammonium compounds are polymerised jointly with at least one other unsaturated compound. As such unsaturated compounds there come into consideration, more especially, compounds containing the atomic grouping $$CH_2=C<$$ 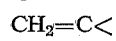

such as vinyl esters of organic acids, for example, vinyl acetate, vinyl formate, vinyl butyrate, vinyl benzoate, and also vinyl alkyl ketones, vinyl halides such as vinyl chloride, vinyl fluoride, vinylidene chloride, and vinylaryl compounds such as styrene and substituted styrenes, and also compounds of the acrylic acid series such as esters of acrylic acid and alcohols or phenols containing no quaternary ammonium groups, for example, ethyl acrylate, butyl acrylate, dodecylacrylate, acrylonitrile or acrylic acid amide and derivatives thereof substituted at the amide-nitrogen atom and containing no quaternary ammonium groups, and also analogous derivatives of methacrylic acid, α-chloracrylic acid, crotonic acid, maleic acid or fumaric acid. There may also be used polymerized olefins, such as isobutylene, butadiene and 2-chlorobutadiene. Preference is given the derivatives of acrylic acid containing no quaternary ammonium groups. Binary, ternary or more complex copolymers may be made, of which the properties can be adjusted by the choice of the starting materials, the relative proportions of the individual components and the polymerisation conditions.

The polymerisation may be carried out in bulk, in solution or in emulsion, the customary polymerisation techniques being used. Thus, for example, it is of advantages to use a polymerisation catalyst. There may be used the usual compounds that catalyse polymerisations, such as organic or inorganic peroxides or persalts, for example, peracetic acid, acetyl peroxide, benzoyl peroxide, benzoyl-acetyl peroxide, lauryl peroxide, cumene hydroperoxide, tertiary-butyl hydroperoxide, para-menthane hydroperoxide, hydrogen peroxide, percarbonates, persulphates or perborates. The proportions of these additions are chosen in known manner depending on the course of reaction or the desired properties of the polymer. If desired, a plurality of agents catalysing the polymerisation may be used. The action of the polymerisation catalysts may be enhanced by the action of heat and/or actinic rays. It may also be possible to carry out the polymerisation only with the aid of heat and/or actinic rays without the addition of a catalytic compound. In order to modify the speed of reaction of the polymerisation and the molecular weight of the polymer produced a so-called regulator may be added such, for example, as a mercaptan, terpene or the like.

It is also of advantage to carry out the polymerisation in the absence of air or oxygen and in the presence of an inert gas, such as nitrogen or carbon dioxide. It is also possible to use, in addition to the aforesaid catalyst and regulators, so-called activators. Such activators are, for example, inorganic oxidisable oxygen-containing sulphur compounds, such as sulphur dioxide, sodium bissulphite, sodium sulphite, ammonium bisulphite, sodium hydrosulphite and sodium thiosulphate. By the simultaneous use of the aforesaid activators and polymerisation catalysts yielding oxygen there are formed so-called redox systems, which favourably influence the polymerisation process. As activators there may also be used water-soluble aliphatic tertiary amines, such as triethanolamine or diethylethanolamine. It is also possible to accelerate the action of the polymerisation catalyst by the addition of a heavy metal compound, which is capable of existing in more than one valency stage and is present in the reduced condition, or by the addition of a complex cyanide of iron, cobalt, molybdenum, mercury, zinc, copper or silver or a mixture of such complexes. When the polymerisation is carried out in an emulsion the monomeric compounds are advantageously emulsified with the aid of an emulsifying agent. As emulsifying agents there come into consideration those of cation-active or non-ionogenic character. Among the group of cation-active emulsifying agents there may be used, for example, compounds of higher fatty amines with acetic acid, hydrochloric acid or sulphuric acid such as octadecylamine acetate, (dodecyl)-diethylcyclo-hexylamine sulphate, and also salts of diethylaminoethyl esters of higher fatty acids or salts of the type of oleyl amido ethyl-diethylamine acetate

There are also suitable quaternary amonium compounds, such as cetyl-dimethyl-benzyl-ammonium chloride, cetyl-trimethyl-ammonium bromide, para-(trimethylammonium)-benzoic acid cetyl ester methosulphate, cetyl-pyridinium methosulphate, octadecyl-trimethyl-ammonium bromide or the quaternary ammonium compound from diethyl sulphate and triethanolamine tristearate.

Among the non-ionogenic emulsifying agents there may be mentioned polyglycol ethers or fatty acids, fatty amines or fatty alcohols, of high molecular weight, such as cetyl alcohol, oleyl alcohol or octadecyl alcohol, for example, the reaction products of 15–30 mols of ethylene oxide with 1 mol of the fatty alcohol. There may also be used emulsifying agents having a pronounced wetting action, such as octylphenol polyglycol ethers, and also lauryl alcohol polyglycol ethers or polyhydric alcohols partially esterified with higher fatty acids such, for example, as glycerine monolaurate and sorbitol monolaurate. There may also be used mixtures of such emulsifying agents or mixtures of such emulsifying agents with protective colloids, such as polyvinyl alcohols, partially hydrolysed polyvinyl esters, and also starches or starch derivatives, for example, dextrin, and also cellulose ethers, polyethylene oxides, and generally also with water-soluble polymers or copolymers which contain free hydroxyl, amino or carboxylic acid amide groups. Finally, such protective colloids may be used alone.

If the polymerisation is carried out in solutions, there may be used a solvent in which only the monomeric compounds are soluble and in which the polymers are insoluble. Alternatively, there may be used solvents in which the polymers are also soluble. Suitable solvents are e.g. water and organic solvents, such as methylene chloride and dichlorethane.

The polymerisation may be carried out at the ordinary temperature. However, it is more advantageous to carry out the polymerisation at a raised temperature. Suitable temperatures are, for example, 40–95° C., and especially 55–90° C. Considerable quantities of heat are often liberated in the polymerisations, so that suitable cooling devices must be used, in order to maintain the desired polymerisation temperature. This is necessary when a large quantity is polymerised in one batch. In order to utilise the heat liberated and easily control the polymerisation temperature it has been found advantageous in the case of emulsion polymerisation, for example, to place in the polymerisation apparatus only a small part of the total quantity of an emulsion to be treated and to allow the polymerisation to commence in this portion. When this portion of the emulsion attains a certain temperature, for example, 60–70° C., the remaining cold emulsion is run in in such manner that the temperature is maintained constant. Towards the end of the polymerisation it is often necessary to supply heat externally.

Depending on the polymerisation conditions and the starting materials used, the polymeric compounds are obtained in the form of viscous solutions, granulates or in the form of emulsions. The material which is obtained directly by the polymerisation may be used without being further worked up. Frequently it is preferable to work it up before hand in a suitable manner for example, modifying substances, such as softening agents, for example, dibutyl phthalate or dioctyl phthalate or sebacic acid ester, or organic or inorganic pigments or filling materials may be added. Furthermore, the polymerisation of the monomeric compounds may be carried out in the presence of a substratum; for example, the polymerisation may be carried out on a textile material. For this purpose the textile material is advantageously impregnated with a solution or emulsion of the monomers, and then the polymerisation is brought about with the addition of a polymerisation catalyst by heating the material. When polymerisable and hardenable quaternary compounds are used, the polymerisation and the hardening may be carried out in two separate steps, by first polymerising the material and then hardening it. Alternatively, both operations may be carried out simultaneously. For carrying out the hardening it is of advantage to use a hardening catalyst. For this purpose the customary hardening catalysts may be used, for example, acids such as hydrochloric acid, sulphuric acid or formic acid, or salts of strong acids with weak bases, for example ammonium salts of strong inorganic or organic acids, such as ammonium chloride, ammonium sulphate, ammonium nitrate, ammonium oxalate or ammonium lactate. When solutions in organic solvents are used, there come into consideration catalysts which are soluble in the organic solvent, for example, strong organic acids such as formic acid, acetic acid, chloracetic acid, or compounds capable of splitting off acid at a raised temperature, such as tartaric acid diethyl ester or triacetin.

The copolymers obtainable by the process of the invention can be used for a very wide variety of purposes. They are generally applicable for all applications involving the use of polymerisation resins or polymerisation and condensation resins. They can be used for the manufacture of moulding masses and moulded bodies, films, fibres, adhesives or lacquers. Certain copolymers possess rubber-like properties, and are suitable as rubber substitutes which are resistant to benzene and benzine. Products which have been obtained from suitable starting materials can be used, inter alia, as assistants in the textile, leather and paper industries. They can be used for preparing impregnating and coating compositions, for example, textiles can be rendered water-repellent with suitably substituted compounds. Some polymers are also suitable for animalising cellulose-containing textile materials, and also as after-treating agents for improving the fastness to washing and water of dyeings or prints of water-soluble direct-dyeing dyestuffs, of which the solubility in water is due to the presence of sulphonic acid or carboxylic acid groups. Such an after-treatment may be combined with an after-treatment with a copper salt. The new products are also suitable in dyeing, printing or dressing natural or artificial fibres with pigments or for producing matte effects on polyamide fibres.

In general dressings produces with the products of this invention withstand use well.

The following examples illustrate the invention the parts being by weight unless otherwise stated and the relationship between parts by weight and parts by volume being the same as that of the kilogram to the liter:

Example 1

17 parts of N-[(β-diethylamino)-ethyl]-acrylic acid amide are heated with 9.25 parts of epichlorhydrin for 1½ hours while stirring in a boiling water bath. The reaction product is clearly soluble in water and can be diluted by the addition of 26 parts of water to form a solution of about 50 percent strength of the quaternary compound of the formula

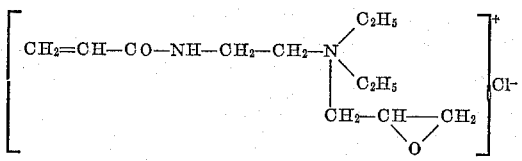

The solution can be used directly for polymerisation.

Example 2

A mixture of 17 parts of N-[(β-diethylamino)-ethyl]-acrylic acid amide and 9.35 parts of chloracetamide is heated for ½ hour, while stirring, in a boiling water bath. By the addition of 26 parts of water to the cooled reaction product there is formed a solution of about 50 percent strength of the quaternary compound of the formula

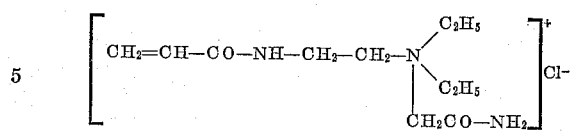

which solution is suitable for polymerisation.

Example 3

A mixture of 17 parts of N-[(β-diethylamino)-ethyl]-acrylic acid amide and 12.35 parts of N-methylol-chloracetamide is reacted in a manner analogous to that described in Example 2. After dissolving the reaction product in 29 parts of water there is obtained a solution of about 50 percent strength of the quaternary compound of the formula

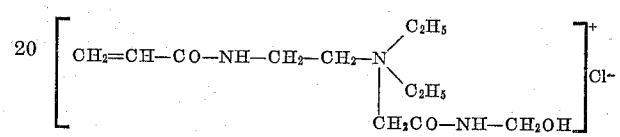

which solution is suitable for polymerisation.

In a similar manner other acrylic acid amides containing tertiary amino groups can be quaternated for example, N-[(β-dimethylamino)-ethyl]-acrylic acid amide, or the corresponding acrylic acid amide of 3-dimethylamino-propylamine, of 3-diethyl-propylenediamine or of aminopropyl-morpholine.

Example 4

28.5 parts of styrene are emulsified, while vigorously stirring mechanically or shaking, in a mixture of 3 parts of the solution of about 50 percent strength of the quaternary compound described in Example 1, 1 part of trioxyethyl-lauryl-ammonium acetate, 0.1 part of isooctanol and 68.5 parts of distilled water. The emulsion is polymerised for 2 hours at 70–80° C., while stirring, after the addition of 2 parts of hydrogen peroxide of 30 percent strength, then a further 2 parts of hydrogen peroxide of 30 percent strength are added, and polymerisation is completed in a further 3 hours at the same temperature. After filtering off a small amount of coarse constituents, there is obtained a thinly liquid stable finely divided dispersion having a polymer content of 28 percent, which is suitable for dressing purposes.

Example 5

27 parts of styrene are emulsified in the manner described in Example 4 in a mixture of 6 parts of the solution of about 50 percent strength of the quaternary ammonium compound described in Example 3, 2 parts of trioxyethyl-lauryl-ammonium acetate, 0.1 part of isooctanol and 67 parts of distilled water, and polymerisation is carried on for 4 hours at 70–80° C. with the addition in portions of 2 parts of potassium persulfate solution of 10 percent strength. There is obtained a thinly liquid stable finely divided dispersion having a dry content of 28–29%, which is suitable for dressing purposes.

Example 6

21 parts of styrene and 6 parts of n-butyl acrylate are emulsified in the manner described in Example 4 in a mixture of 6 parts of the solution of about 50 percent strength of the quaternary ammonium compound described in Example 3, 2 parts of trioxyethyl-lauryl-ammonium acetate, 0.1 part of isooctanol and 67 parts of distilled water. The resulting emulsion is polymerised for 5 hours at 70–80° C., while stirring, by the addition in portions of 2 parts of potassium persulfate solution of 10 percent strength. There is obtained a thinly liquid finely divided stable dispersion, which has a dry content of 28–29% and is suitable for dressing purposes, especially for the production of matt effects on fabrics of fine polyamide fibers.

Example 7

15 parts of acrylonitrile, 13.5 parts of n-butyl acrylate and 3 parts of the solution of about 50 percent strength of the quaternary compound described in Example 3 are emulsified in the manner described in Example 4 in a solution of 1 part of trioxyethyl-lauryl-ammonium acetate, 0.1 part of isooctanol and 68.5 parts of water. The emulsion is heated to 70° C. under nitrogen and with stirring, whereupon 1 part of an aqueous solution of potassium persulfate is added to start polymerisation. At the end of an hour 1 part of a solution of 10 percent strength of potassium persulfate is added and the whole is stirred for 1½ hours. After cooling, the whole is filtered to separate off any coarse constituents. The resulting thinly liquid stable finely divided dispersion has a polymer content of 29 percent, which is suitable for the dressing of textiles.

Example 8

90 parts of freshly distilled vinyl acetate are emulsified in a solution of 3.25 parts of lauroylamido-propyl-trimethyl-ammonium methosulfate

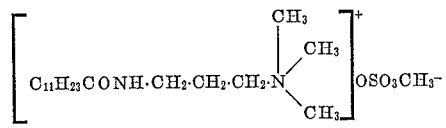

in 110 parts of distilled water, to which solution 0.25 part of isooctanol and 20 parts of an aqueous solution of 50 percent strentgh of the quaternary ammonium compound from acrylic acid-(3-diethylamino-propyl)-amide and chloracetamide

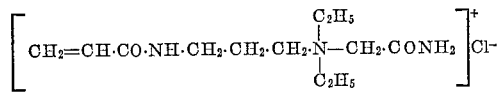

prepared in the manner described in Example 2, are added. The pH value of the emulsion is adjusted to 5.0–5.2 by means of a little 2 N-acetic acid. Polymerisation is carried on by heating to 62–64° C. in an atmosphere of nitrogen and by the gradual addition of a catalyst solution of 0.65 part of potassium persulfate, 3.25 parts of lauroyl-amido-propyl-trimethyl-ammonium methosulfate and 30 parts of distilled water and is completed at the end of 2 hours. After cooling, the resulting polymer emulsion is filtered to separate off traces of coarse constituents. It has a high degree of dispersion and a polymer content of 41 percent and is eminently suitable for dressing purposes in combination with paraffin emulsions containing aluminium salt or with water-soluble precondensates of melamine or urea formaldehyde resins.

Example 9

When 60 parts of freshly distilled vinyl acetate and 30 parts of n-butyl acrylate are emulsified in a solution of 1.75 parts of [γ-(lauroylamido)-propyl]-trimethyl-ammonium methosulfate and 1.5 parts of the condensation product from 1 mol of the commercial primary amine mixture prepared from tall oil acid and 160 mols of ethylene oxide in 110 parts of distilled water, and to the emulsion of these monomers there are added 0.25 part of isooctanol and 20 parts of an aqueous solution of 50 percent strength of the quaternary ammonium compound from acrylic acid-(3-diethylamino-propyl)-amide and chloracetamide obtained in a manner analogous to that described in Example 2, an emulsion is obtained which is worked up in the manner described in Example 8. There is obtained a finely divided dispersion of a softer cationactive resin which is eminently suitable for the production of softer dressings in the manner described in Example 8.

Example 10

A mixture of 75 parts of isobutyl acrylate and 20 parts of acrylonitrile and 0.25 part of isooctanol is emulsified in a mixture of 5 parts of an aqueous solution of 50 percent strength of the quaternary compound from acrylic acid-(3-dimethyl-aminopropyl)-amide and chloracetamide obtained in a manner analogous to that described in Example 2, and 3.25 parts of [γ-(lauroylamino)-propyl]-trimethyl-ammonium methosulfate and 120 parts of distilled water while stirring vigorously or agitating. The emulsion is polymerised by heating to 65° C. with stirring and in an atmosphere of nitrogen; a solution of 0.65 part of potassium persulfate, 3.25 parts of lauroylamido-propyl-trimethyl-ammonium methosulfate in 30 parts of distilled water is added gradually. Polymerisation is completed in a further 2 hours, and a finely divided emulsion having a resin content of 30.2 percent is obtained which when spread on substrata and dried forms a soft, rubber-like film. The emulsion is suitable for the preparation of water-fast dressings when used in admixture with paraffin emulsions containing an aluminium salt or water-soluble melamine- or urea formaldehyde precondensates, more particularly in admixture with those melamine resins of which the methylol groups are partially etherified with octadecyl alcohol.

Example 11

For the preparation of the quaternary compound from N-(γ-diethylamino-propyl)-methacrylamide and chloracetamide

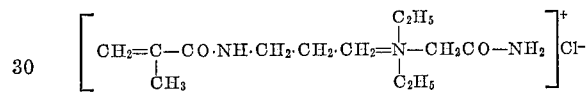

39.66 parts (⅕ mol) of [N-(γ-diethylamino-propyl)]-methacrylamide, which is prepared in known manner, for example by the action of methacrylic acid chloride on γ-diethylamino propylamine, and 18.70 parts of chloracetamide (⅕ mol) are heated for ½ hour on a boiling water-bath while stirring. 58.36 parts of distilled water are then added, whereby the reaction product gradually dissolves. There is obtained a practically clear aqueous solution of 50 percent strength of the quaternary monomeric compound which is suitable for polymerisation purposes without further purification. Quaternation may also be advantageously carried out by heating the reaction components in the presence of 58.36 parts of water to 80° C. until a clear solution is formed.

Example 12

In a mixture of 24 parts of an aqueous solution of 50 percent strength of the quaternary ammonium compound

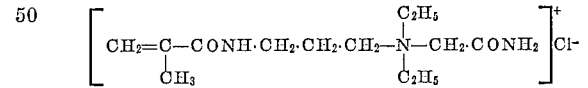

obtained as described in Example 11, 0.1 part of isooctanol, 1 part of the cation active emulsifier

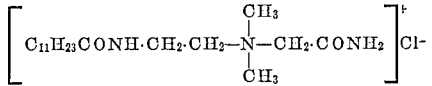

(obtainable by reacting lauroylamido-ethyl-dimethyl-amine and chloracetamide in known manner) and 45 parts of distilled water, 28 parts of n-butyl acrylate are emulsified with vigorous stirring or agitation. Half of this emulsion is polymerised whilst the other half is added in the course of the reaction. The air in the polymerisation vessel is displaced by nitrogen and polymerisation is carried on by heating to 65° C. with stirring and the gradual addition of half of a catalyst solution from 0.2 part of potassium persulfate, 1 part of the aforementioned cation active emulsifier and 5 parts of distilled water. The other half of the catalyst solution is mixed with the remainder of the emulsion which is allowed to flow in in the course of the reaction in the space of about 1 hour.

After this addition is complete, the temperature rises owing to the heat of the reaction. Polymerisation is completed by heating for 2 hours at 70–75° C. and by the addition of a solution of 0.15 part of potassium persulfate and 0.15 part of ammonium chloride in 3 parts of distilled water. The resulting cation active stable resin emulsion has a polymer content of 37 percent and is suitable for the dressing of textiles. It can be diluted with water to any degree. The finely dispersed cation active resin has substantivity and is absorbed on textiles having an electro-negative character. This dispersion of a soft resin is especially suitable in admixture with hardenable water-soluble melamine formaldehyde precondensates for the preparation of improved fast to washing dressings which are also fast to organic solvents such as are used in dry cleaning.

*Example 13*

A mixture of 6 parts of acrylic acid amide, 2 parts of n-butyl acrylate, 4 parts of an aqueous solution of 50 percent strength of the quaternary monomeric compound from N-(β-diethylamino propyl)-acrylic acid amide and chloracetamide prepared as described in Example 3, and 87 parts of distilled water is heated to 63° C. under nitrogen and with stirring. In the course of 2 hours a solution of 0.1 part of potassium persulfate in 2 parts of distilled water is added in portions. Finally the whole is stirred for another ½ hour at 65–70° C., after which polymerisation is complete and a viscous opal liquid is obtained. It has a polymer content of 9.75 percent and is suitable for the preparation of sizing agents which diminish the electrostatic charge of textile. The liquid leaves a clear colorless film on drying which, after being heated to 130° C., is insoluble and only capable of swelling in water.

*Example 14*

For the preparation of the quaternary compound from N:N'-(dimethylamino-propyl)-fumaric acid diamide and chloracetamide

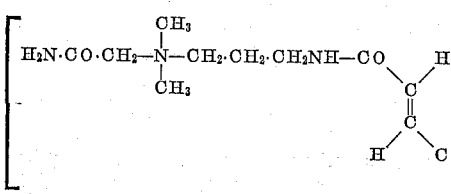
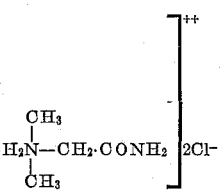

2.84 parts of N:N'-(γ-dimethylamino propyl)-fumaric acid diamide which is obtained according to known methods, for example by the action of fumaryl chloride on an aqueous solution of γ-dimethylaminopropylamine according to the method of Schotten and Baumann (colorless crystals melting at 197–198° C.) are mixed with 1.87 parts of chloracetamide and 4.71 parts of water. The mixture is heated for 1½ hours in a boiling water-bath, whereupon an aqueous solution of 50 percent strength of the quaternary ammonium compound is obtained which is suitable for copolymerisation.

Without adding any water, there is obtained the solid quaternary ammonium compound by heating equimolecular quantities of the reaction components in the boiling water-bath for ¼ of an hour.

In the same manner the corresponding ammonium compound can be obtained from fumaric acid diamide with epichlorhydrin.

*Example 15*

The quaternary compound from N-(γ-dimethylamino-propyl)-crotonic acid amide and chloracetamide

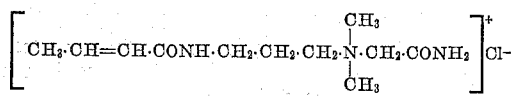

can be obtained in the following manner:

To a mixture of 28 parts of dimethylaminopropylamine in 42 parts of acetonitrile, 26.1 parts of crotonyl chloride are added dropwise with stirring in the course of ½ hour, care being taken that the temperature does not rise above 60° C. by cooling from time to time. After all the acid chloride has been added, the reaction mixture is stirred for 1½ hours at 50–55° C. and then cooled to room temperature. By adding 33.3 parts of an aqueous solution of caustic soda of 30 percent strength the hydrochloride of the basic amide is decomposed and liberated from the solvent by evaporation in vacuo at 65° C. bath temperature at most. The residue is an oil containing solid sodium chloride and to which 80 parts of acetone are added and which is filtered to separate off the sodium chloride. The sodium chloride which is squeezed on the filter is washed with 40 parts of acetone, whereupon the acetone solutions are combined and the acetone distilled off. As residue there remains behind the N-(γ-dimethyl-amino-propyl)-crotonic acid amide as an orange colored, thinly viscous oil, crude yield being 40.5 parts corresponding to 95.3 percent of the theory. It is purified in high vacuum by distillation; nearly colorless clear oil, boiling point 91–96° C. under 0.1 mm. of pressure.

For the purpose of conversion into the quaternary ammonium compound 3.4 parts of the crotonic acid amide are mixed with 1.87 parts of chloracetamide and 5.27 parts of distilled water and heated for 1 hour in a boiling water-bath. There are obtained 10.54 parts of an aqueous solution of about 50 percent strength of the quaternary ammonium compound which is suitable for copolymerisation without further purification.

In a still shorter space of time the N-(γ-dimethyl-amino-propyl)-crotonic acid amide can be converted also in the absence of water with chloracetamide into the quaternary ammonium compound, which is a tough mass.

In a similar manner the crotonic acid amide can also be converted with epichlorhydrin into the corresponding quaternary ammonium compound.

*Example 16*

A mixture of 37.5 parts of isobutyl acrylate, 10 parts of acrylonitrile and 0.13 part of isooctanol is emulsified in 57.5 parts of distilled water to which 1.62 parts of [(γ-lauroyl-amido)-propyl]-trimethyl-ammonium methosulfate and 5 parts of the aqueous solution of about 50 percent strength of the quaternary ammonium compound described in Example 14, with vigorous stirring or agitation. For the purpose of polymerisation the emulsion is stirred and heated at 70° C. under nitrogen and a solution of 0.33 part of potassium persulfate and 1.63 parts of [(γ-lauroyl-amido)-propyl]-trimethyl ammonium methosulfate in 15 parts of distilled water is added gradually in the course of 2 hours. Polymerisation is carried on for another hour at 75–80° C. The reaction vessel is then put under slightly reduced pressure and a strong current of nitrogen is blown for a short time over the hot emulsion to remove slight quantities of volatile monomers.

The resulting finely divided emulsion has a dry content of 38.0 percent and when spread on substrata and dried forms a soft, rubber-like film. It is suitable for the dressing purposes described in Example 10.

*Example 17*

If the solution of the quaternary ammonium compound used in Example 16 is replaced by the same quantity of an aqueous solution of 50 percent strength of the quaternary ammonium compound from N-[(γ-dimethyl-amino)-propyl]-crotonic acid amide and chloracetamide prepared as described in Example 15 and operations are carried on as described in Example 16, there is also obtained a finely divided emulsion having a dry content of 40.1 percent. It is also suitable for the dressing purposes described in Example 10.

*Example 18*

27 parts of acrylonitrile are mixed with 6 parts of an aqueous solution of 50 percent strength of the quaternary, monomeric compound

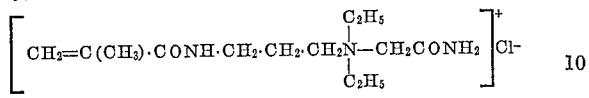

prepared in the manner described in Example 11 and emulsified in a solution of 0.35 part (2 percent calculated on the total of monomers) of lauroylamido-ethyl-diethyl-methyl ammonium methosulfate

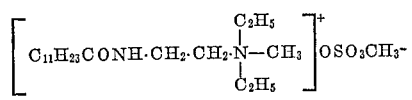

in 67 parts of distilled water. Half of this emulsion is heated to 55° C. under nitrogen and with stirring, and in order to start polymerisation half of a solution of 0.05 part of potassium persulfate, 0.25 part of lauroylamido ethyl-diethyl methylammonium methosulfate in 3 parts of distilled water is added. The other half of this catalyst solution is added to the other half of the above emulsion of monomers which is added dropwise in the course of 50 minutes to the polymerisation. After the addition is complete, the whole is heated for another 2½ hours at 75° C. The precipitated finely grained copolymer is separated on a suction filter, washed from any adhering emulsifier and dried. It is suitable for the preparation of improved dyeable polyacrylonitrile fibers or films.

What is claimed is:

1. A stable aqueous cationactive dispersion comprising:
   (A) in finely divided state a polymerization product which contains copolymerized
      (I) an amide of a copolymerizable aliphatic carboxylic acid of the formula

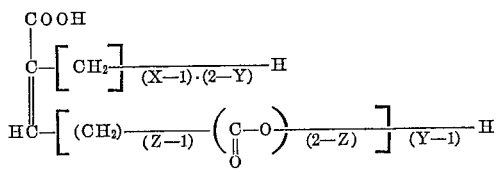

wherein each of X, Y and Z represents a positive whole number of at most 2, containing in the amide portion of the molecule one quaternary nitrogen atom which by one of its four valences is bound to the amide nitrogen by an alkylene radical containing at least two and at most three carbon atoms, and each of the remaining three valences of the quarternary nitrogen is bound to a saturated aliphatic radical, and
      (II) at least one other polymerizable compound selected from the group consisting of a diene containing conjugated double bonds and a monoethylenically unsaturated compound, which last-mentioned compound is in a proportion of at most 50% calculated on the weight of total monomers when said compound is acrylonitrile, and
   (B) a member selected from the group consisting of
      (I) Cationactive dispersing agent selected from the group consisting of
         (a) a compound of a higher fatty amine with an acid selected from the group consisting of acetic acid, hydrochloric acid and sulphuric acid,
         (b) salt of diethylaminoethyl ester of a higher fatty acid,
         (c) oleyl amido ethyl-diethylamine acetate, and
         (d) a quaternary ammonium compound selected from the group consisting of
            (1) cetyl - dimethyl - benzyl - ammonium chloride,
            (2) cetyl-trimethyl-ammonium bromide,
            (3) para-(trimethylammonium)-benzoic acid cetyl ester methosulphate,
            (4) cetyl-pyridinium methosulphate,
            (5) octadecyl-trimethyl-ammonium bromide, and
            (6) the quaternary ammonium compound from diethyl sulphate and triethanolamine tristearate,
      (II) non-ionogenic emulsifying agent selected from the group consisting of
         (a) polyglycol ether of a fatty acid,
         (b) polyglycol ether of a fatty amine,
         (c) polyglycol ether of a fatty alcohol,
         (d) octylphenol polyglycol ether,
         (e) polyhydric alcohol partially esterified with a higher fatty acid, and
      (III) protective colloid selected from the group consisting of
         (a) polyvinyl alcohol,
         (b) partially hydrolyzed polyvinyl ester,
         (c) starch,
         (d) dextrin,
         (e) cellulose ether,
         (f) polyethylene oxide, and
         (g) water-soluble polymer which contains groups selected from those consisting of
            (1) amino and
            (2) carboxylic acid amide.

2. A stable aqueous cationactive dispersion comprising (A) in a finely divided state a polymerization product which contains copolymerized (I) the compound of the formula

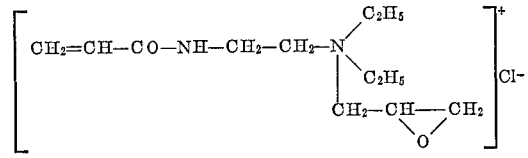

and (II) at least one other polymerizable compound selected from the group consisting of a diene containing conjugated double bonds and a monoethylenically unsaturated compound which last-mentioned compound is employed in a proportion of at most 50% calculated on the weight of total monomers when said compound is acrylonitrile and (B) a member selected from the group consisting of
   (I) cationactive dispersing agent selected from the group consisting of
      (a) a compound of a higher fatty amine with an acid selected from the group consisting of acetic acid, hydrochloric acid and sulphuric acid,
      (b) salt of diethylaminoethyl ester of a higher fatty acid,
      (c) oleyl amido ethyl-diethylamine acetate, and
      (d) a quaternary ammonium compound selected from the group consisting of
         (1) cetyl - dimethyl - benzyl-ammonium chloride,
         (2) cetyl-trimethyl-ammonium bromide,
         (3) para-(trimethylammonium)-benzoic acid cetyl ester methosulphate,
         (4) cetyl-pyridinium methosulphate,
         (5) octadecyl-trimethyl-ammonium bromide, and
         (6) the quaternary ammonium compound from diethyl sulphate and triethanolamine tristearate, (II) non-ionogenic emulsifying agent selected from the group consisting of
(a) polyglycol ether of a fatty acid,
(b) polyglycol ether of a fatty amine,
(c) polyglycol ether of a fatty alcohol,
(d) octylphenol polyglycol ether,
(e) polyhydric alcohol partially esterified with a higher fatty acid, and (III) protective colloid selected from the group consisting of
(a) polyvinyl alcohol,
(b) partially hydrolyzed polyvinyl ester,
(c) starch,
(d) dextrin,
(e) cellulose ether,
(f) polyethylene oxide, and
(g) water-soluble polymer which contains groups selected from those consisting of
(1) amino and
(2) carboxylic acid amide.

3. A stable aqueous cationactive dispersion comprising (A) in a finely divided state a polymerization product which contains copolymerized (I) the compound of the formula

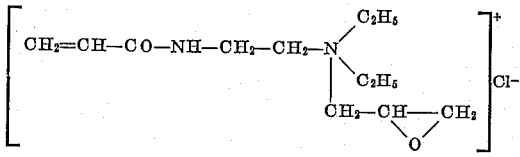

and (II) styrene and (B) a member selected from the group consisting of
(I) cationactive dispersing agent selected from the group consisting of
(a) a compound of a higher fatty amine with an acid selected from the group consisting of acetic acid, hydrochloric acid and sulphuric acid,
(b) salt of diethylaminoethyl ester of a higher fatty acid,
(c) oleyl amido ethyl-diethylamine acetate, and
(d) a quaternary ammonium compound selected from the group consisting of
(1) cetyl-dimethyl-benzyl-ammonium chloride,
(2) cetyl-trimethyl-ammonium bromide,
(3) para-(trimethylammonium)-benzoic acid cetyl ester methosulphate,
(4) cetyl-pyridinium methosulphate,
(5) octadecyl-trimethyl-ammonium bromide, and
(6) the quaternary ammonium compound from diethyl sulphate and triethanolamine tristearate, (II) non-ionogenic emulsifying agent selected from the group consisting of
(a) polyglycol ether of a fatty acid,
(b) polyglycol ether of a fatty amine,
(c) polyglycol ether of a fatty alcohol,
(d) octylphenol polyglycol ether,
(e) polyhydric alcohol partially esterified with a higher fatty acid and (III) protective colloid selected from the group consisting of
(a) polyvinyl alcohol,
(b) partially hydrolyzed polyvinyl ester,
(c) starch,
(d) dextrin,
(e) cellulose ether,
(f) polyethylene oxide, and
(g) water-soluble polymer which contains groups selected from those consisting of
(1) amino and
(2) carboxylic acid amide.

4. In a stable aqueous cationactive dispersion the copolymerization product of (1) the compound of the formula

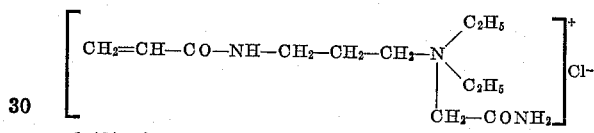

and (2) vinyl acetate.

5. In a stable aqueous cationactive dispersion the copolymerization product of (a)

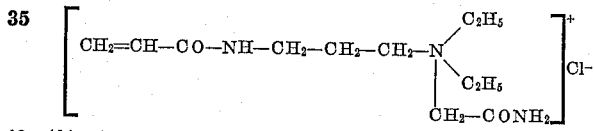

(b) vinyl acetate and (c) n-butylacrylate.

References Cited in the file of this patent

UNITED STATES PATENTS

| | | |
|---|---|---|
| 2,567,836 | Anthes | Sept. 11, 1951 |
| 2,649,438 | Bruson | Aug. 18, 1953 |
| 2,662,875 | Chaney | Dec. 15, 1953 |
| 2,723,968 | Williams | Nov. 15, 1955 |
| 3,008,851 | Shimizu et al. | Nov. 14, 1961 |

FOREIGN PATENTS

| | | |
|---|---|---|
| 515,194 | Belgium | Nov. 14, 1952 |

OTHER REFERENCES

D'Alelio: "Fundamental Principles of Polymerization," John Wiley and Sons, Inc., 1952, p. 95.